(12) United States Patent
Penuel

(10) Patent No.: US 10,344,791 B2
(45) Date of Patent: Jul. 9, 2019

(54) MINIMAL FASTNER ASSEMBLY METHODOLIGY

(71) Applicants: BSH Home Appliances Corporation, Irvine, CA (US); BSH Hausgeräte GmbH, Munich (DE)

(72) Inventor: Michael Penuel, Swansboro, NC (US)

(73) Assignees: BSH Home Appliances Corporation, Irvine, CA (US); BSH Hausgerate GmbH, Munich (DE)

( * ) Notice: Subject to any disclaimer, the term of this patent is extended or adjusted under 35 U.S.C. 154(b) by 0 days.

(21) Appl. No.: 15/823,649

(22) Filed: Nov. 28, 2017

(65) Prior Publication Data

US 2019/0162220 A1    May 30, 2019

(51) Int. Cl.
| | |
|---|---|
| *F16B 17/00* | (2006.01) |
| *A47B 88/407* | (2017.01) |
| *A47L 15/42* | (2006.01) |
| *A47J 37/06* | (2006.01) |
| *F24C 15/00* | (2006.01) |
| *F24C 15/16* | (2006.01) |
| *A47J 36/34* | (2006.01) |

(52) U.S. Cl.
CPC ............ *F16B 17/00* (2013.01); *A47B 88/407* (2017.01); *A47J 36/34* (2013.01); *A47J 37/0623* (2013.01); *A47L 15/4251* (2013.01); *F24C 15/007* (2013.01); *F24C 15/16* (2013.01); *A47B 2210/17* (2013.01)

(58) Field of Classification Search
CPC ... F16B 17/00; A47B 88/407; A47B 2210/17; A47B 47/0075; A47B 47/03; A47B 47/05; A47J 36/34; A47J 37/0623; A47L 15/4251; F24C 15/007; F24C 15/16
See application file for complete search history.

(56) References Cited

U.S. PATENT DOCUMENTS

| | | | | |
|---|---|---|---|---|
| 1,523,653 | A * | 1/1925 | Larson | A47B 47/03 24/569 |
| 1,896,600 | A * | 2/1933 | Vance | A47B 88/407 312/241 |
| 1,944,394 | A * | 1/1934 | Bales | A47B 47/03 126/39 B |
| 2,571,622 | A * | 10/1951 | Schmidt | A47B 47/03 16/389 |
| 2,686,704 | A * | 8/1954 | Wolters | A47B 47/03 312/257.1 |
| 3,228,736 | A * | 1/1966 | Beckerman | A47B 47/05 220/665 |
| 3,240,545 | A * | 3/1966 | Rulf | A47B 47/05 312/264 |
| 3,248,157 | A * | 4/1966 | Piker | A47B 47/03 312/265.5 |

(Continued)

*Primary Examiner* — Hanh V Tran
(74) *Attorney, Agent, or Firm* — Michael E. Tschupp; Andre Pallapies; Brandon G. Braun

(57) ABSTRACT

Techniques are provided for constructing an appliance housing without the need for vertical fasteners. In one or more implementations, the structural components of an appliance housing are fashioned with a set of engagement points and slots, the engagement points and slots acting to physically arrest the structural components when assembled. Horizontal fasteners are then used to further secure the appliance housing.

20 Claims, 9 Drawing Sheets

(56) References Cited

U.S. PATENT DOCUMENTS

| | | | | |
|---|---|---|---|---|
| 3,347,609 A * | 10/1967 | Mann | ............... | A47B 47/03 |
| | | | | 126/191 |
| 3,408,127 A * | 10/1968 | Vincens | ............ | A47B 13/08 |
| | | | | 312/194 |
| 4,120,551 A | 10/1978 | Codtschalck | | |
| 4,289,363 A * | 9/1981 | Andersson | ........ | A47B 47/03 |
| | | | | 312/199 |
| 4,296,982 A * | 10/1981 | Kullander | ........ | A47B 47/03 |
| | | | | 211/135 |
| 4,378,137 A * | 3/1983 | Gibson | ............ | A47B 87/02 |
| | | | | 312/108 |
| 4,426,935 A * | 1/1984 | Nikoden, Jr. | ..... | A47B 47/03 |
| | | | | 109/79 |
| 4,579,400 A * | 4/1986 | French | ............ | A47B 47/03 |
| | | | | 312/257.1 |
| 4,671,580 A * | 6/1987 | Shiou | ............... | A47B 47/03 |
| | | | | 312/265.5 |
| 4,836,626 A * | 6/1989 | Taylor | ............. | A47B 47/03 |
| | | | | 312/257.1 |
| 4,848,859 A * | 7/1989 | Edmonds | .......... | A47B 47/03 |
| | | | | 312/257.1 |
| 5,246,286 A * | 9/1993 | Huebschen | ...... | A47B 47/03 |
| | | | | 312/249.8 |
| 5,325,651 A | 7/1994 | Meyer et al. | | |
| 5,368,380 A * | 11/1994 | Mottmiller | ..... | A47B 47/0075 |
| | | | | 312/111 |
| 5,466,058 A * | 11/1995 | Chan | ............ | A47B 47/0075 |
| | | | | 312/107 |
| 5,813,738 A * | 9/1998 | Cheng | ............. | F16B 12/14 |
| | | | | 312/257.1 |
| 5,823,650 A | 10/1998 | Lin | | |
| 6,039,417 A | 3/2000 | Snoke et al. | | |
| 6,371,584 B1 * | 4/2002 | Alreck | ............ | A47B 67/04 |
| | | | | 177/144 |
| 6,585,225 B1 * | 7/2003 | Lake | ............ | A47B 47/0075 |
| | | | | 206/320 |
| 6,786,009 B1 * | 9/2004 | McGunn | ........ | A47B 47/03 |
| | | | | 312/263 |
| 7,134,673 B2 * | 11/2006 | Ferraro | ........ | A47B 87/0253 |
| | | | | 280/33.991 |
| 7,263,756 B2 | 9/2007 | Sosnowski | | |
| 8,418,874 B2 * | 4/2013 | Ahlgrim | ....... | A47B 43/02 |
| | | | | 220/529 |
| 8,449,052 B2 | 5/2013 | Briggs et al. | | |
| 9,072,403 B2 | 7/2015 | Braden et al. | | |
| 10,076,185 B1 * | 9/2018 | Bennett | ........ | A47B 47/0066 |
| 2002/0074911 A1 * | 6/2002 | Chen | ............ | A47B 47/03 |
| | | | | 312/265.5 |
| 2004/0119385 A1 * | 6/2004 | Timmermann | .... | A47B 47/0075 |
| | | | | 312/257.1 |
| 2004/0178704 A1 * | 9/2004 | Saravis | ....... | A47B 47/0033 |
| | | | | 312/111 |
| 2005/0023944 A1 * | 2/2005 | Baker | ......... | A47B 47/0075 |
| | | | | 312/263 |
| 2005/0166524 A1 | 8/2005 | Attalla | | |
| 2008/0265728 A1 * | 10/2008 | Collins | ........ | A47B 47/0075 |
| | | | | 312/326 |
| 2010/0133966 A1 | 6/2010 | Blaga | | |
| 2010/0181881 A1 * | 7/2010 | Hsu | ............ | A47B 47/0008 |
| | | | | 312/257.1 |
| 2012/0272832 A1 * | 11/2012 | Kwon | .......... | A47B 81/00 |
| | | | | 99/324 |
| 2013/0025640 A1 * | 1/2013 | Nalley | ......... | A47L 15/4251 |
| | | | | 134/198 |
| 2015/0292747 A1 | 10/2015 | Daughtridge, Jr. et al. | | |
| 2016/0073821 A1 * | 3/2016 | Shei | ........... | A47J 36/34 |
| | | | | 220/573.1 |
| 2016/0331128 A1 * | 11/2016 | Chuang | ......... | A47B 88/00 |
| 2017/0282349 A1 * | 10/2017 | Zhao | ............ | B25H 3/00 |

\* cited by examiner

MINIMAL FASTNER ASSEMBLY METHODOLIGY

FIELD OF TECHNOLOGY

The present technology relates to improvements in appliance housing assembly.

BACKGROUND

Traditional appliance housings typically require fasteners to be inserted both horizontally and vertically through the top, bottom, and walls of the housing.

However, when fasteners are inserted vertically into the housing, this often adds additional height to the housing due to the heads of the fasteners projecting out from top, bottom, or both panels of the housing. As a result, additional clearance is needed both above and below traditional housings in order to accommodate the projecting heads.

While removing the vertical fasteners is an option, this results in a net decrease of stability and structural integrity for traditional appliance housings.

Accordingly, what is needed is an appliance housing that can be assembled without vertical fasteners yet still maintain stability, functionality, and structural integrity.

BRIEF SUMMARY

The present invention is directed to improvements in appliance housing construction. These improvements include reducing the total number of fasteners required to assemble the appliance housing while still maintaining functionality and structural integrity. These improvements also obviate the need for vertical fasteners, allowing for reduced clearance both above and below the appliance housing.

These improvements are accomplished by utilizing a system of engagement points fashioned into the structural components of an appliance housing to arrest physical movement of the structural components. As represented herein, a lance/tab and slot connection is used for these engagement points.

Additionally, this system of engagement points allows for only horizontal fasteners to be used in appliance housing construction without sacrificing functionality and structural integrity. This results in a reduction in manufacturing costs due to the reduction in both number of fasteners used as well as labor time to assemble the appliance housing.

This results in an appliance housing that costs less than traditional appliance housings, while still maintaining functional and structural integrity.

Various other objects, features, aspects, and advantages of the present invention will become more apparent to those skilled in the art upon review of the following detailed description of preferred embodiments of the invention and accompanying drawings in which like numerals represent like components.

DETAILED DESCRIPTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Throughout this disclosure, the terms top, bottom, front, back, left and right may be used. These terms are only intended to provide relational orientation with respect to one another. For example, any two opposed sides can be a right side and a left side and by changing to an opposed viewpoint, right versus left will be changed. Thus, top, bottom, front, back, left and right should not be considered limiting and are used only to distinguish their relationship to one another.

Figure 1:
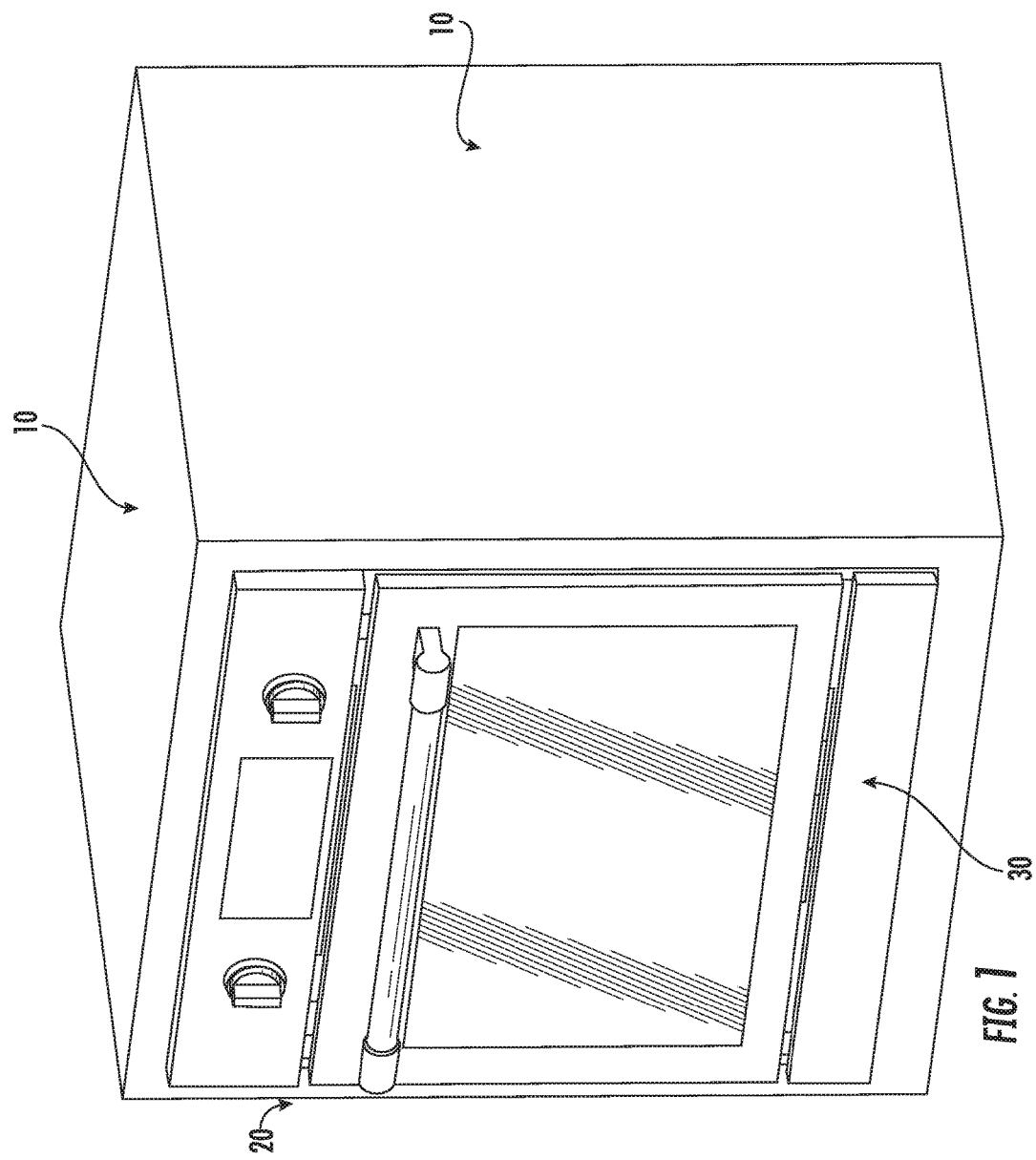
FIG. 1 is a perspective, front view of a household appliance with an appliance housing constructed in accordance with this disclosure.

FIG. 1 illustrates a front perspective of an appliance (20) situated in a wall setting (10). The appliance is depicted as a built-in wall oven, however, any suitable appliance can be used, for example, a dishwasher, a microwave, a coffee maker, etc. The appliance can be configured as a built-in appliance in a wall or cabinet setting.

Located at the bottom of the appliance (20) is an appliance housing (30). The appliance housing is installed in the wall setting (10) along with the appliance, and the appliance housing can be configured as a housing with no access to the interior of the housing, a housing wherein the interior is accessible by a removable panel, or, as in an exemplary embodiment, a housing holding a sliding member that can slide in and out of the housing.

Figure 2:
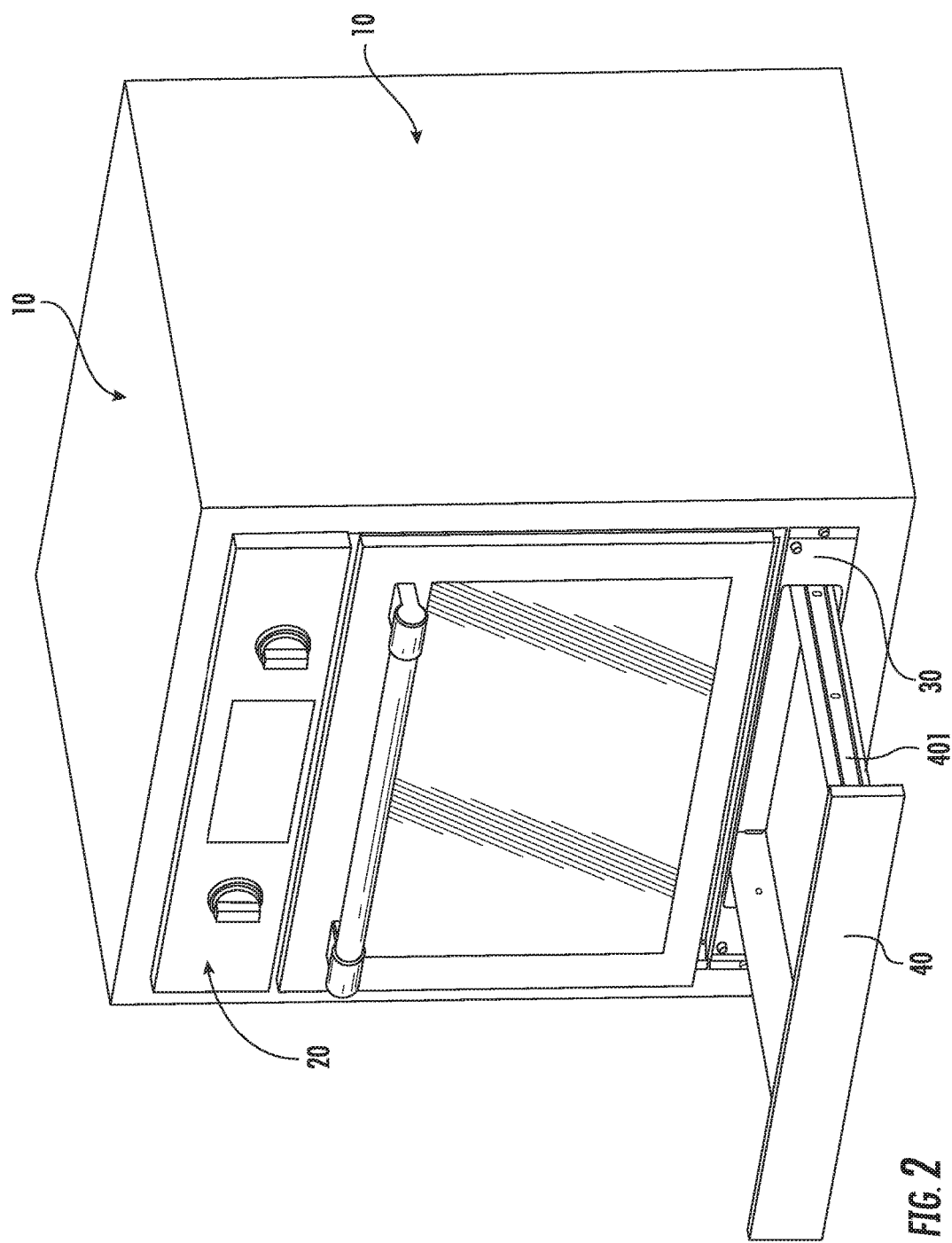
FIG. 2 is a perspective, front view of a household appliance with an appliance housing constructed in accordance with this disclosure, wherein the accompanying drawer is extended.

FIG. 2 illustrates an exemplary embodiment wherein the appliance housing (30) has a sliding member. In an exemplary embodiment, the sliding member is configured as a sliding drawer (40). The drawer is engaged with the appliance housing via a pair of rails (401) attached to the sides of the drawer. The pair of rails allow for the drawer to freely slide in and out of the interior of the appliance housing, constituting a "closed" or "open" position for the drawer.

Figure 3:
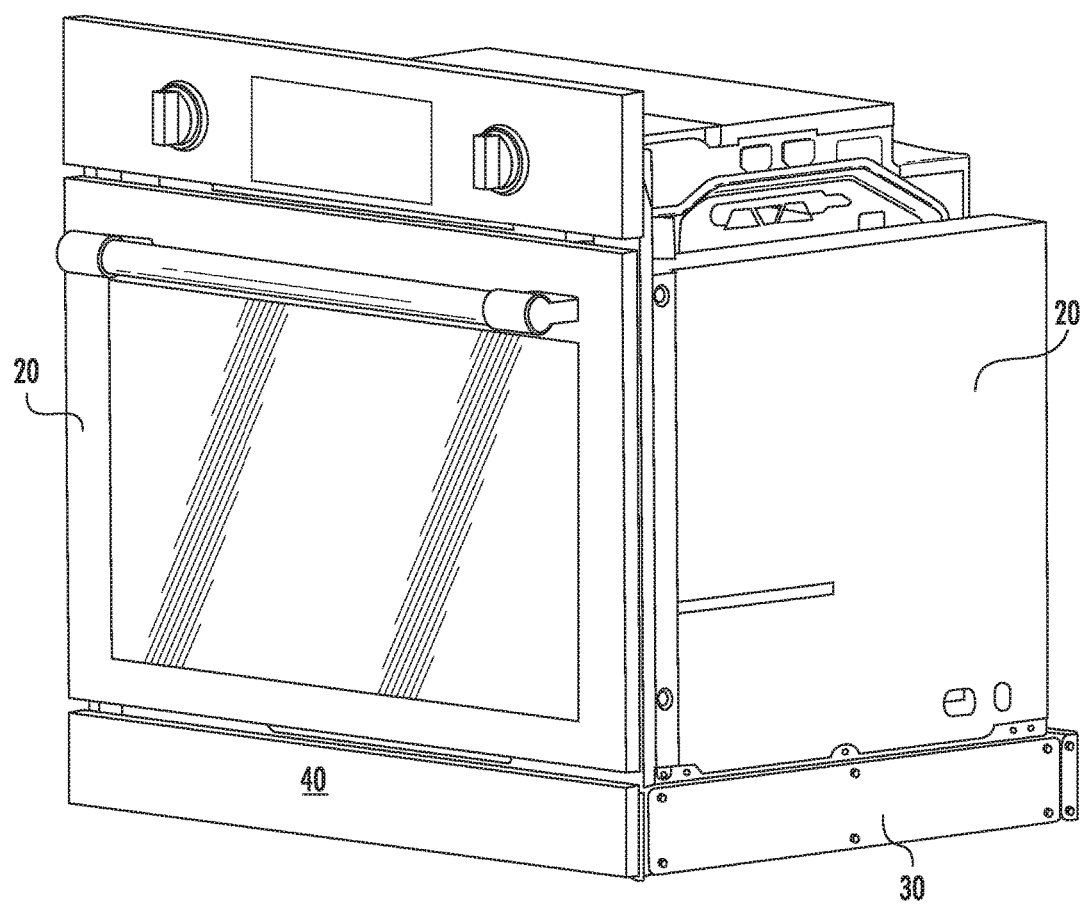
FIG. 3 is a perspective, front view of a household appliance with an appliance housing constructed in accordance with this disclosure, wherein the surrounding cabinetry is removed from view.

FIG. 3 illustrates a front perspective of the appliance (20) and the appliance housing (30) with the wall setting (10) removed. In an exemplary embodiment, the appliance is disposed above the appliance housing, and the appliance housing and appliance are in some manner of physical contact.

The appliance housing (30) is capable of supporting a portion of the weight of the appliance (20) when situated in the wall setting (10). In an exemplary embodiment, the appliance housing fully supports the entire weight of the appliance. In an exemplary embodiment, fully supporting the appliance results in no decrease in either stability or functionality for the appliance housing, and the sliding drawer (40) has no reduction in movement due to the appliance housing bearing the complete weight of the appliance.

Figure 4:
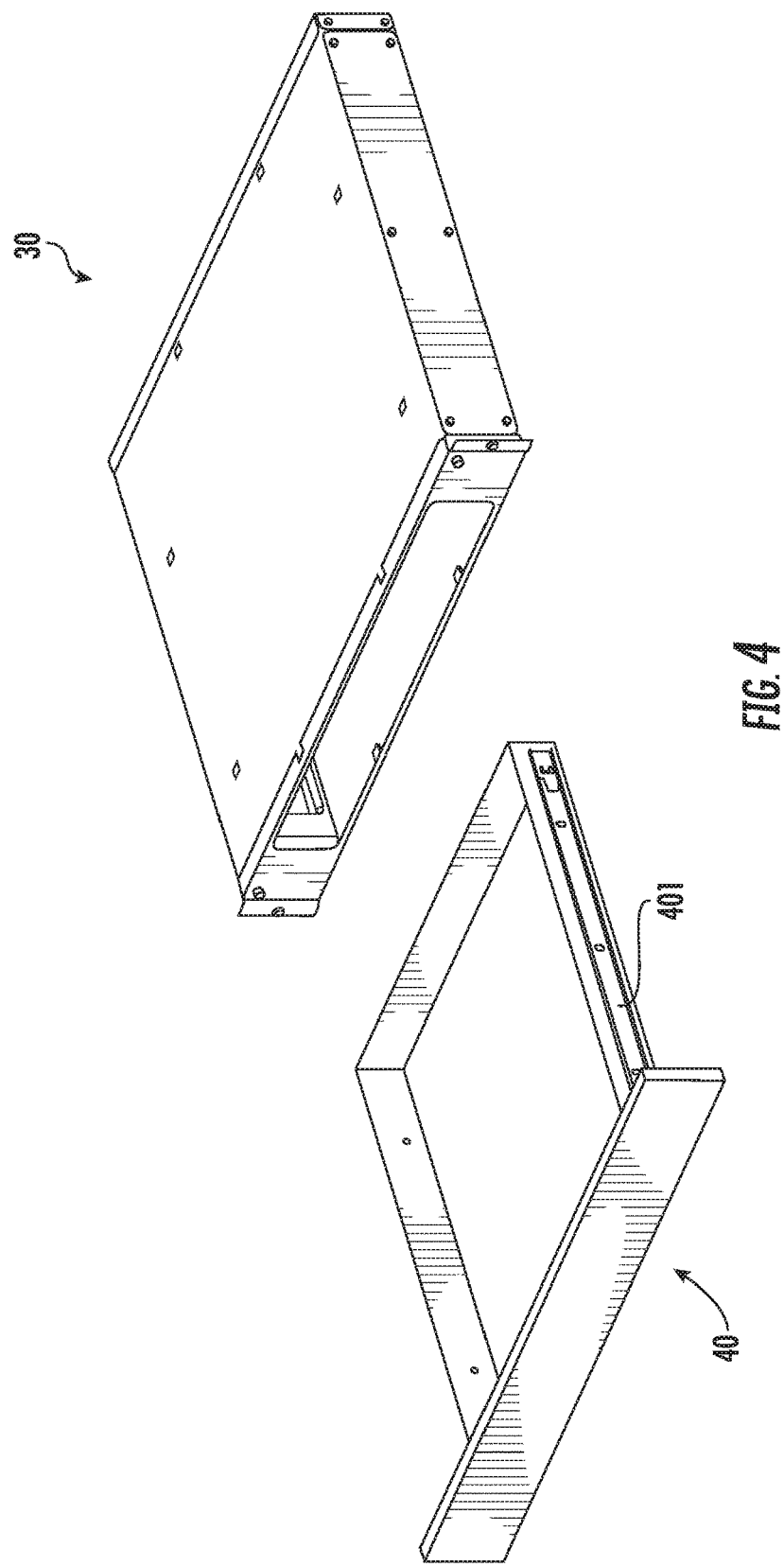
FIG. 4 is a perspective, front view of an appliance housing constructed in accordance with this disclosure and the accompanying drawer.

FIG. 4 illustrates the appliance housing (30) with both the appliance (20) and the wall setting (10) removed. FIG. 4 also illustrates the sliding drawer (40), with the sliding drawer removed from the appliance housing.

The appliance housing (30) is constructed in accordance with a minimal fastener assembly methodology as described herein.

Figure 5:
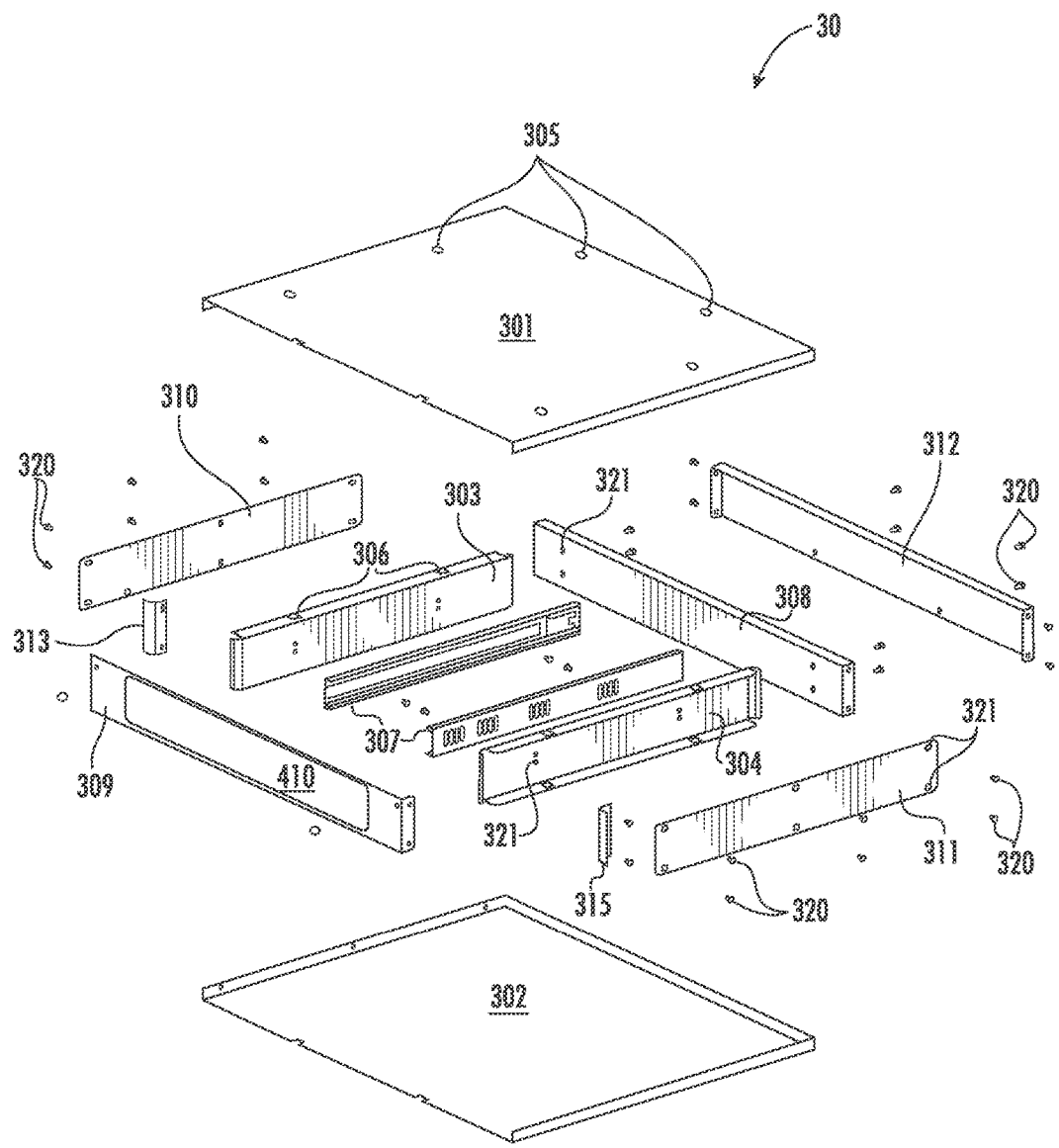
FIG. 5 is an exploded, perspective view of an appliance housing constructed in accordance with this disclosure.

FIG. 5 illustrates an exploded, perspective view of the appliance housing (30) constructed in accordance with the minimal fastener assembly methodology. As depicted in FIG. 5, the appliance housing is constructed out of various structural components that are assembled together to form the appliance housing. As will be discussed, some of the depicted structural components are identical pieces that are flipped, rotated, or arranged in some fashion that allows for the identical components to be used in different locations in the appliance housing.

The structural components of the appliance housing may be constructed out of any appropriate material. In an exemplary embodiment the structural components are constructed out of either galvanized or stainless steel sheet metal which can then be folded or bent into the necessary shape for each individual structural component. As a result, in this exemplary embodiment most of the structural components are made out of a single piece of sheet metal that is shaped as needed. Alternative embodiments allow for the structural components to be constructed out of alternative ferrous metals or non-ferrous metals that can be folded or bent into the appropriate shape, or out of polymers that are formed in the appropriate shape.

As illustrated in FIG. 5, the appliance housing (30) has an upper panel (301) and a lower panel (302) that form the top and bottom, respectively, of the appliance housing. The upper and lower panels are interchangeable and, in an exemplary embodiment, are identical panels with the upper panel being an identical copy of the lower panel. As a result, costs for the appliance housing are reduced due to only needing one panel configuration, said panel configuration being used for both the upper panel and the lower panel.

The upper and lower panels have a plurality of engagement points (305) that function as points of attachment for structural components of the appliance housing (30). In an exemplary embodiment, these engagement points are in a lance/tab configuration, and these lance/tab engagement points make hard connections with the structural components of the appliance housing. In an exemplary embodiment, the lance/tab engagement points attach to slots in other structural components of the appliance housing.

The appliance housing (30) further has multiple inner supports that are disposed between the upper panel (301) and the lower panel (302). Two of these inner supports are depicted in FIG. 5 as a first inner side wall (303) and a second inner side wall (304). The first and second inner side walls are interchangeable and, in an exemplary embodiment, are identical with the first inner side wall being an identical copy of the second inner side wall. As a result, costs for the appliance housing are reduced due to needing only one inner side wall configuration, and this single inner side wall configuration is then used for both the first and second inner side walls.

Various structural components of the appliance housing (30) have a plurality of slots (306) that function as points of connection with the engagement points (305) on the upper and lower panels. In an exemplary embodiment, the first and second inner side walls (303 & 304) have a plurality of slots, and these slots are used to make a hard, physical connection with the lance/tab engagement points (305) located on the upper and lower panels.

Various structural components of the appliance housing (30) also have a plurality of holes (321) through which fasteners (320) are inserted horizontally in order to further secure the structural components.

The first inner side wall (303) and the second inner side wall (304) are attached to the lower panel (302) by connecting the slots (306) on both the first and second inner side wall with the engagement points (305) on the lower panel. In an exemplary embodiment, the inner side walls are attached by sliding the side walls in a manner that engages the lance/tab engagement point of the lower panel with the slots on the inner side walls, thus arresting movement of the inner side walls. In an exemplary embodiment, the attachment is tight and secure, allowing for little motion or movement once attached.

Figure 6:
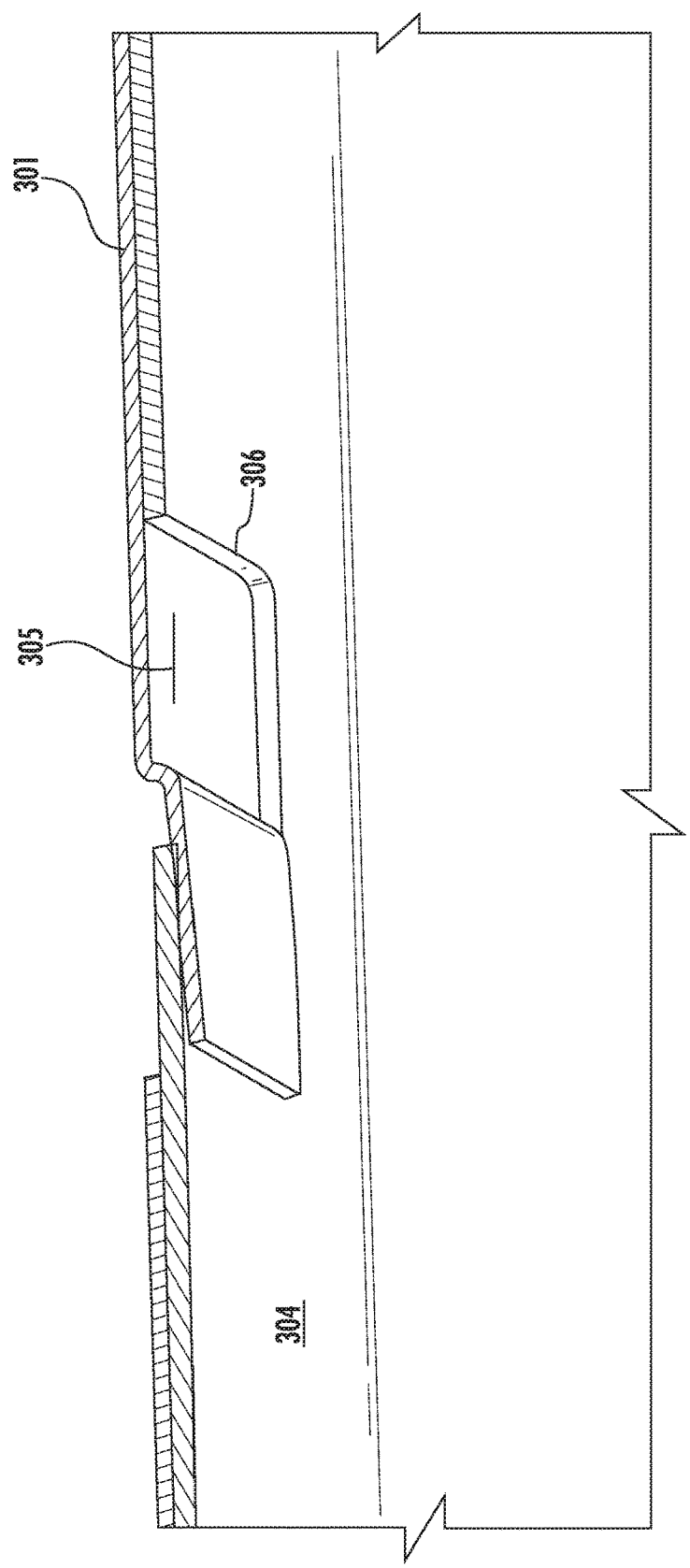
FIG. 6 is a perspective, lower view of an engagement point system in accordance with the present disclosure.
Figure 7:
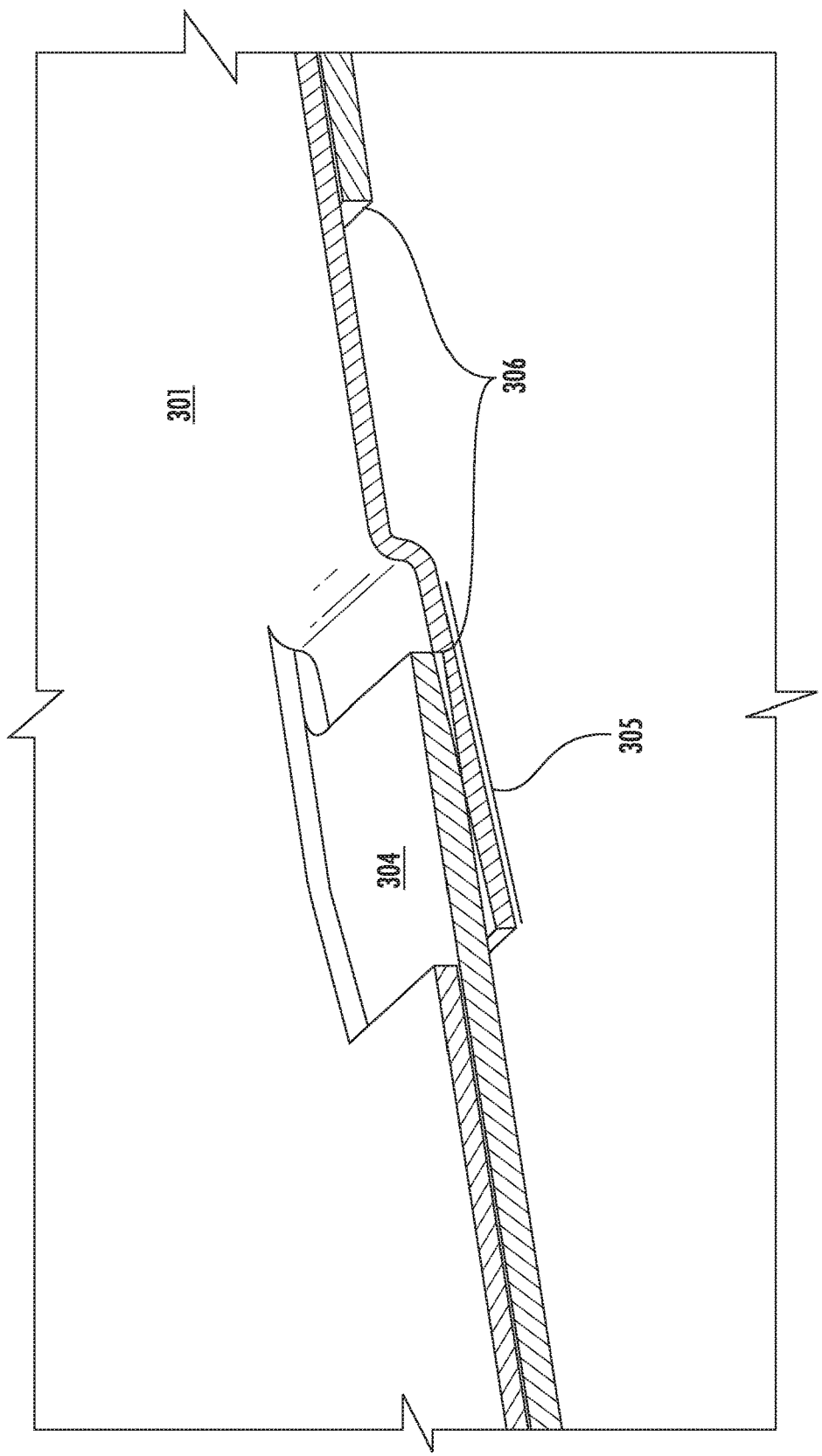
FIG. 7 is a perspective, upper view of an engagement point system in accordance with the present disclosure.
Figure 8:
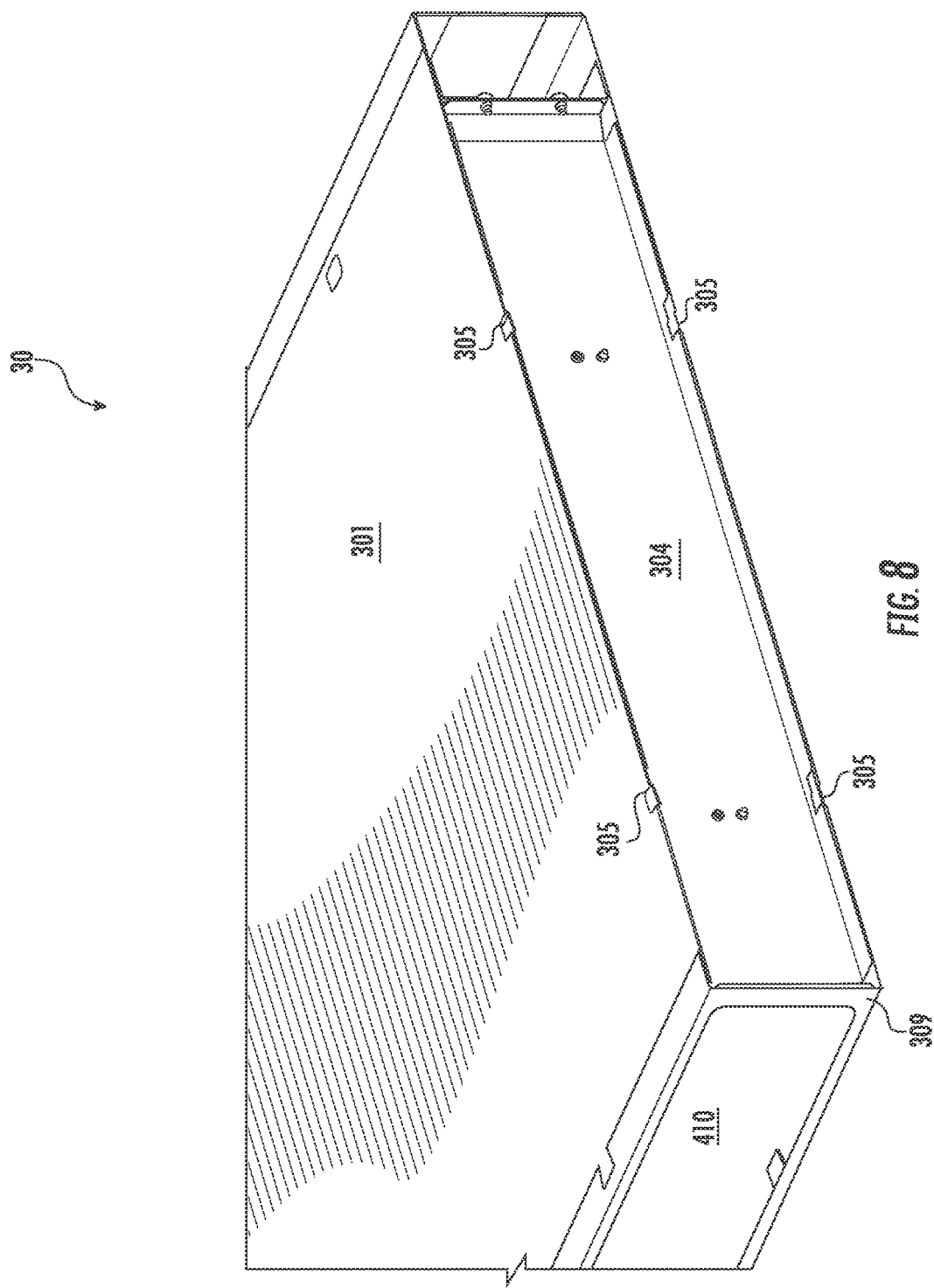
FIG. 8 is a perspective view of an engagement point system in partially completed appliance housing constructed in accordance with this disclosure.

An example of this lance/tab and slot connection is illustrated in FIGS. 6, 7, and 8 which depict a partially-completed appliance housing (30) from the view of the second inner side wall (304).

In FIG. 6, which illustrates a lower perspective of the appliance housing (30) from the view of the second inner side wall (304), the lance/tab of an engagement point (305) on the upper panel (301) enters a slot (306) on the second inner side wall. The lance/tab is designed to allow for the lance/tab to enter the slot and to be in physical contact with a surface on the second inner side wall. This arrangement arrests physical movement of both the upper panel and the second inner side wall in both the horizontal and vertical directions.

This lance/tab and slot connection is further illustrated from an upper perspective of the second inner side wall (304) in FIG. 7. In FIG. 7, the lance/tab of an engagement point (305) on the upper panel (301) enters a slot (306) on the second inner side wall. The lance/tab is designed to allow for the lance/tab to enter the slot and to be in physical contact with a surface on the second inner side wall.

FIG. 8 further illustrates the lance/tab and slot connection along the second inner side wall (304) of the appliance housing (30). In FIG. 8, both the upper panel (301) and the lower panel (not shown) are engaged with the second inner wall (304) via the multiple engagement points (305) on both the upper and lower panels. These multiple engagement points, which feature a lance/tab design, are in physical connection with the second inner wall via slots (306) on the second inner wall.

As a result of this design, when the appliance housing (30) is completed, movement of the upper panel (301) and the lower panel (302) is arrested along both the horizontal and vertical planes.

Returning to FIG. 5, attached to the first inner side wall (303) and the second inner side wall (304) are a pair of side rails (307). In the complete appliance housing (30), these side rails are engaged with the drawer rails (401) of the drawer (40), and allow for movement of the drawer along the length of the side rails. The side rails also allow for the drawer to be removed from the appliance housing, or re-attached as needed.

The appliance housing (30) also has an additional inner support depicted in FIG. 5 as an inner rear wall (308). The inner rear wall is attached to the upper panel (301) and the lower panel (302) via the engagement points (305) on both the upper and lower panels. In an exemplary embodiment, the inner rear wall has a plurality of slots (306) or notches that allow for a greater connection with the engagement points on the upper and lower panels. The inner rear wall also has holes (321) for fasteners.

As depicted in FIG. 5, the appliance housing (30) also has a front panel (309). The front panel is attached to the upper panel (301) and the lower panel (302) via the engagement points (305) on both the upper and lower panels. In an alternative embodiment, the front panel may have a plurality of slots (306) or notches that allow for a greater connection with the engagement points on the upper and lower panels. The front panel also has holes (321) for fasteners.

The front panel (309) may be a uniform piece without an opening, or, as in the exemplary embodiment depicted in FIGS. 2, 4, and 5, the front panel may have an opening (410) that allows access to the interior of the completed appliance housing (30). In an exemplary embodiment, this opening allows for a sliding member, such as the drawer (40) depicted in FIGS. 2 and 4, to be engaged with side rails (307) inside the appliance housing, allowing for the drawer to be moved in and out of the appliance housing through the opening on the front panel.

The appliance housing (30) further has multiple outer walls that partially or completely cover the inner supports. As depicted in FIG. 5, a first outer side wall (310) is affixed to the first inner side wall (303), and a second outer side wall (311) is affixed to the second inner side wall (304). As further depicted in FIG. 5, an outer rear wall (312) is affixed to the inner rear wall (308). The multiple outer walls have holes (321) for fasteners. In an alternative embodiment, the multiple outer walls may have slots (306) to facilitate engagement with the upper and lower panels (301 & 302).

Securing the multiple outer walls to the inner supports are multiple fasteners (320). In an exemplary embodiment the fasteners are of a screw fastener type, however, any appropriate fastener can be used. The fasteners are inserted horizontally through the outer walls and into the inner supports located directly behind the point of insertion. In some locations, a single fastener can secure more than one inner support.

In the exemplary embodiment, fasteners are only inserted horizontally; no vertical fasteners are used. Because the appliance housing (30) utilizes engagement points (305) to attach several of the various structural components to each other, movement of the structural components is arrested. As a result, the completed appliance housing has the stability of similar assemblies that utilize both vertical and horizontal fasteners, but with a significant reduction in the overall number of fasteners due to only horizontal fasteners being used.

Additionally, due to the lack of vertical fasteners, no vertical clearance is needed either above or below the completed appliance housing (30) because no portion of any fastener projects above the surface of either the upper panel (301) or the lower panel (302).

In an exemplary embodiment, a pair of brackets (313 & 315) are attached to both the first inner side wall (303) and the second inner side wall (304) before attaching the first outer side wall (310) and the second outer side wall (311). The brackets are attached via fasteners inserted horizontally through the bracket and into the respective inner side wall. The bracket serves as additional support for the entire appliance housing (30) as well as a buttress for the front support (309). In an exemplary embodiment the brackets are interchangeable and identical.

Example Procedures

The following discussion describes techniques for assembling an appliance housing in accordance with the present disclosure. The procedures are shown as a set of blocks that specify operations to be performed by one or more persons or one or more devices and are not necessarily limited to the orders shown for performing the operations by the respective blocks. In portions of the following discussion, reference will be made to FIGS. 1-8 and respective reference numbers.

Figure 9:
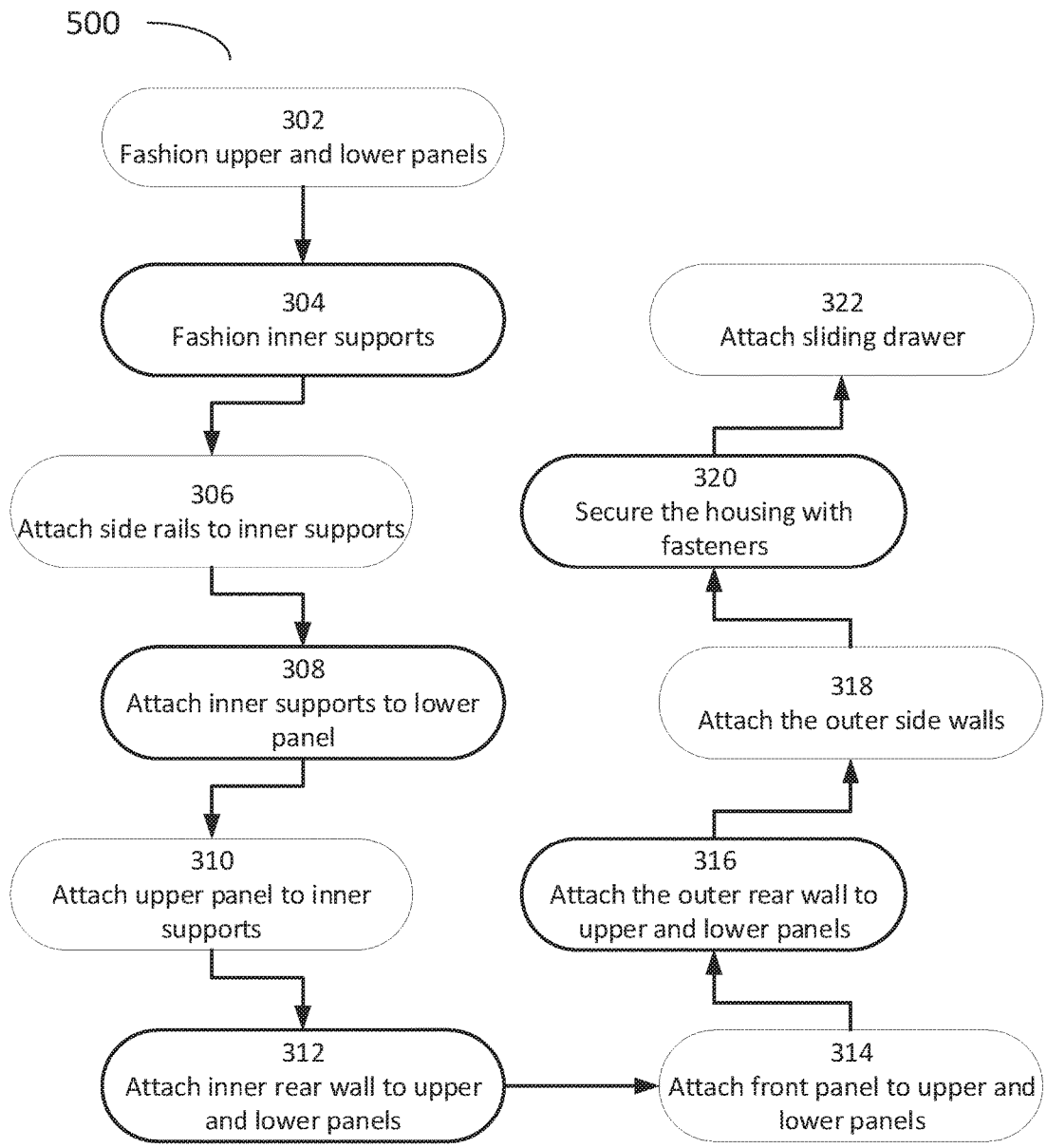
FIG. 9 is a flow diagram depicting a procedure in an example implementation in which an appliance housing in accordance with this disclosure is constructed.

FIG. 9 depicts a procedure 500 in an example assembly in which an appliance housing is constructed in accordance with a minimal fastener assembly methodology as described in this disclosure.

At 302 a pair of identical panels are fashioned, the panels serving as an upper panel (301) and a lower panel (302). In an exemplary embodiment, each panel is constructed out of a single piece of sheet metal that is folded and cut as needed per the requirements and dimensions of an appliance housing. During this process multiple engagement points (305) are formed in the panels.

At 304 a pair of identical inner supports are fashioned, the pair of inner supports serving as a first inner side wall (303) and a second inner side wall (304). In an exemplary embodiment, each side wall is constructed out of a single piece of sheet metal that is folded and cut as needed per the requirements and dimensions of an appliance housing. During this process multiple lead-in slots (306) are cut in the supports.

At 306 a pair of side rails (307) are attached to the inner supports, one side rail on each individual support.

At 308, the first and second inner side walls (303 & 304) are attached lengthwise to the lower panel (302), the multiple engagement points on the lower panel attaching to slots (306) in the first and second inner side walls to arrest movement and to hold the first and second inner side walls firmly against the lower panel. The first and second inner side walls are disposed on opposite sides of the same surface of the lower panel and are arranged parallel to each other. This arrangement of the first and second inner side walls is illustrated in FIG. 3.

At 310, the upper panel (301) is attached to the unattached lengthwise sides of the first and second inner side walls (303 & 304), the multiple engagement points on the upper panel attaching to slots (306) in the first and second inner side walls to arrest movement and to hold the upper panel firmly against the first and second inner side walls. The resulting assembly results in the first and second inner side walls being disposed between the upper and lower panels.

At 312, an additional inner support is fashioned, the additional inner support serving as an inner rear wall (308). The inner rear wall is disposed between the upper and lower panels and perpendicular to the first and second inner side walls (303) and (304). The inner rear wall is attached to the upper and lower panels via slots in the inner rear wall that engage with the lance/tab engagement points in the upper and lower panels. The inner rear wall is attached to the first and second inner side walls via fasteners inserted horizontally through the inner rear wall and into the first and second inner side walls.

At 314, a front panel (309) is attached to the appliance housing (30). The front panel is attached opposite the inner rear wall (308), perpendicular to the first and second inner side walls (303) and (304). The front panel is attached to the upper and lower panels via slots in the front panel that engage with the lance/tab engagement points in the upper and lower panels.

Multiple outer walls are fashioned, these outer walls serving as a first outer side wall (310), a second outer side wall (311), and an outer rear wall (312). At 316, the outer rear wall is attached to the upper and lower panels via slots in the outer rear wall that engage with the lance/tab engagement points in the upper and lower panels.

At 318 the first outer side wall is affixed to the first inner side wall (303) and the second outer side wall is affixed to the second inner side wall (304).

At 320, multiple fasteners are inserted horizontally to secure the outer walls and related components.

At 322, a sliding drawer is attached to the appliance housing via the side rails (307) attached to the first and second inner side walls (303 & 304).

While the present technology has been described in connection with several practical examples, it is to be understood that the technology is not to be limited to the disclosed examples, but on the contrary, is intended to cover various modifications and equivalent arrangements included within the spirit and scope of the technology.

What is claimed is:

1. An appliance support housing, comprising:
a first panel, the first panel having a first surface with a first plurality of tabs;
a first support and a second support having a first plurality of slots, the first support and the second support attached to the first panel via the first plurality of tabs being engaged with the first plurality of slots, the first support arranged parallel to the second support;
a second panel having a second surface with a second plurality of tabs, the second panel attached to the first support and the second support via the second plurality of tabs, wherein the second surface faces the first surface;
a rear support attached to the first and second panels via the first and second plurality of tabs, the rear support arranged perpendicular to both the first support and the second support; and
a front support attached to the first and second panels via the first and second plurality of tabs, the front support arranged perpendicular to both the first support and the second support and disposed opposite from the rear support.

2. The support housing of claim 1, wherein the first and second panels are interchangeable.

3. The support housing of claim 1, wherein the first support and the second support are interchangeable.

4. The support housing of claim 1, further comprising:
a plurality of outer walls, an outer wall of the plurality of outer walls overlapping the first support, the second support, and the rear support; and
a plurality of fasteners inserted through the outer wall.

5. The support housing of claim 4, wherein the plurality of fasteners are inserted horizontally.

6. The support housing of claim 1, wherein the front support has an opening.

7. The support housing of claim 6, further comprising:
a first rail guide attached to the first support;
a second rail guide attached to the second support opposite the first rail guide; and
a sliding member engaged with the first and second rail guides, the sliding member partially movable through the opening of the front support.

8. The support housing of claim 7, wherein the support housing weighs less than 70 pounds, has a height less than 4 inches, and a static load support weight of at least 200 pounds.

9. A drawer apparatus, comprising:
a bottom panel having a first surface with a first plurality of tabs;
a first side inner wall having a first plurality of slots, the first side inner wall attached to the bottom panel via one or more tabs of the first plurality of tabs being engaged with the first plurality of slots;
a second side inner wall having a second plurality of slots, the second side inner wall attached to the bottom panel via one or more other tabs of the first plurality of tabs being engaged with the second plurality of slots, the second side inner wall arranged parallel to the first side inner wall;
a top panel having a second surface with a second plurality of tabs, the first side inner wall having a third plurality of slots, and the second side inner wall having a fourth plurality of slots, the top panel attached to the first and second side inner walls via the second plurality of tabs being respectively engaged with the third and fourth plurality of slots, the second surface facing the first surface;
a rear inner wall attached to the bottom and top panels via the first and second plurality of tabs, the rear inner wall arranged perpendicular to the first and second side inner walls;
a front inner wall attached to the bottom and top panels via the first and second plurality of tabs, the front inner wall arranged perpendicular to the first and second side inner walls and disposed opposite the rear inner wall, wherein the front inner wall has an opening;
a first rail guide attached to the first side inner wall;
a second rail guide attached to the second side inner wall opposite the first rail guide; and
a sliding member engaged with the first and second rail guides, the sliding member partially movable through the opening of the front inner wall.

10. The drawer apparatus of claim 9, wherein the bottom and top panels are interchangeable.

11. The drawer apparatus of claim 9, wherein the first side inner wall and the second side inner wall are interchangeable.

12. The drawer apparatus of claim 9, further comprising:
a plurality of outer walls, wherein an outer wall of the plurality of outer walls overlaps the first side inner wall, the second side inner wall, or the rear inner wall; and
a plurality of fasteners inserted horizontally through the outer wall to secure the overlapped first side inner wall, the second side inner wall, or the rear inner wall.

13. The drawer apparatus of claim 12, wherein no fasteners are inserted in a non-horizontal alignment.

14. The drawer apparatus of claim 12, wherein no fasteners are inserted through the bottom panel or the top panel.

15. The drawer apparatus of claim 9, wherein the drawer weighs less than 70 pounds, has a height less than 4 inches, and a static load support weight of at least 200 pounds.

16. The drawer apparatus of claim 9, wherein the sliding member has a front outer wall that overlaps the front inner wall when the sliding member is moved to a closed position.

17. A method of assembly, comprising:
coupling a first side inner wall to a first surface of a first panel via a first plurality of engagement points on the first surface;
coupling a second side inner wall to the first surface of the first panel via the first plurality of engagement points, the second side inner wall arranged parallel to the first side inner wall;
coupling a second panel having a second surface with a second plurality of engagement points on the second surface to the first and second side inner walls, the second surface disposed opposite the first surface;
coupling a rear inner wall to the first and second panels via the first and second plurality of engagement points, the rear inner wall arranged perpendicular to the first and second side inner walls;
coupling a front inner wall to the first and second panels via the first and second plurality of engagement points, the front inner wall arranged perpendicular to the first and second side inner walls and disposed opposite the rear inner wall;
overlapping the first side inner wall, the second side inner wall, and the rear inner wall with a plurality of outer walls; and
securing an outer wall of the plurality of outer walls by inserting fasteners horizontally through the outer wall towards the first side inner wall, the second side inner wall, or the rear inner wall.

18. The method of claim 17, wherein no fasteners are inserted vertically.

19. The method of claim 17, wherein the first panel and the second panel are interchangeable.

20. The method of claim 17, wherein the first side inner wall and the second side inner wall are interchangeable.

* * * * *